United States Patent [19]
Crosno
[11] 3,758,710
[45] Sept. 11, 1973

[54] TIME BASE ERROR CORRECTION SYSTEM, INCLUDING CONVERTER, FOR VIDEO REPRODUCER AND/OR RECORDER

[75] Inventor: Philip M. Crosno, Saratoga, Calif.
[73] Assignee: Cartridge Television, Inc., San Jose, Calif.
[22] Filed: Mar. 9, 1972
[21] Appl. No.: 233,064

[52] U.S. Cl. .................... 178/6.6 TC, 178/69.5 DC
[51] Int. Cl. .......................... H04n 1/22, H04n 5/78
[58] Field of Search ........................ 178/6.6 TC, 6.5, 178/6.6 A, 69.5 DC; 340/174.1 A; 179/100.2 K

[56] References Cited
UNITED STATES PATENTS

| | | | |
|---|---|---|---|
| 3,681,522 | 8/1972 | Tanabe | 178/6.6 TC |
| 3,238,300 | 3/1966 | Bopp et al. | 178/6.6 TC |
| 3,235,662 | 2/1966 | Bopp | 178/6.6 TC |
| 3,676,583 | 7/1972 | Morita | 178/6.6 TC |
| 3,409,736 | 11/1968 | Hurst et al. | 178/6.6 TC |
| 3,202,769 | 8/1965 | Coleman, Jr. | 178/6.6 TC |

*Primary Examiner*—Vincent P. Canney
*Assistant Examiner*—Alfred H. Eddleman
*Attorney*—Charles M. Hogan

[57] ABSTRACT

Disclosed herein is a system for compensating for time base errors existing in helical scan video recorders. On playback horizontal synchronizing signals are stripped from the composite video output of the recorder-reproducer and the stripped horizontal sync signals are applied to the phase detector element of a phase lock loop. To another input of the phase lock loop is applied the synchronizing signal of a simulated television receiver horizontal scanning system. The resultant control signal is filtered and utilized to control the horizontal oscillator in the simulated horizontal scanning system. It is also applied to an analog to digital converter which converts the analog voltage into variable delays, preferably in binary steps. The delays are inserted between the video output of the recorder-reproducer and the input of an actual television receiver monitor.

3 Claims, 1 Drawing Figure

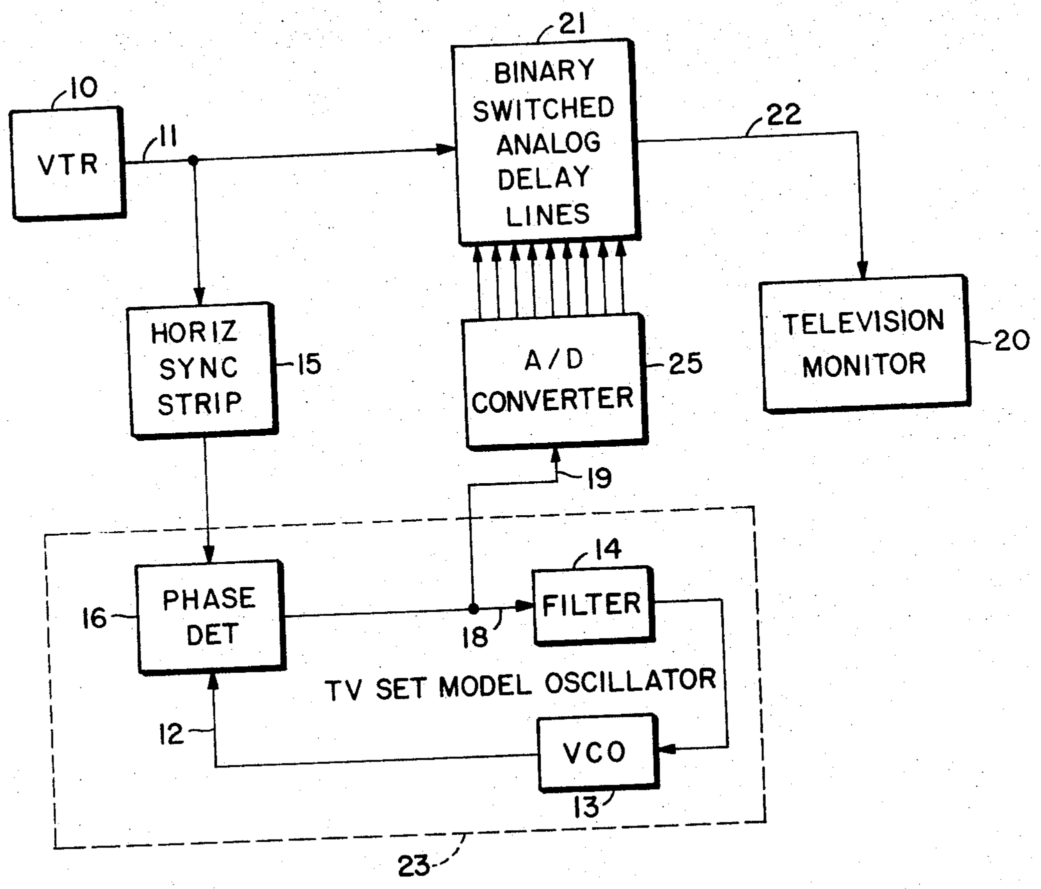
VTR
10
11
BINARY SWITCHED ANALOG DELAY LINES
21
22
TELEVISION MONITOR
20
HORIZ SYNC STRIP
15
A/D CONVERTER
25
19
PHASE DET
16
FILTER
14
18
TV SET MODEL OSCILLATOR
VCO
13
12
23

TIME BASE ERROR CORRECTION SYSTEM, INCLUDING CONVERTER, FOR VIDEO REPRODUCER AND/OR RECORDER

BACKGROUND OF THE INVENTION

Various techniques have been exploited in an endeavor to eliminate time base errors which show up on playback of video reproducing and/or recording systems. In helical video tape recorders, for example, time base errors are generated in that the recordings are discrete units of information. Physical displacements existing between the end of one field and the start of the next introduce discontinuities in information flow. The resultant timing errors manifest themselves as phase errors in the horizontal synchronizing signal output of the reproducer.

Various endeavors to eliminate time base error have been made, for example, those disclosed in the following United States patents:

| | |
|---|---|
| Newell | 3,141,926 |
| Bopp & Krause | 3,238,300 |
| Bopp & Krause | 3,384,707 |
| Gunther | 3,421,951 |
| Dillenburger & Krause | 3,505,473 |
| Krause | 3,614,303 |

An object of the invention is to provide an improved time base error compensation system in which a simulated horizontal scanning system of a television receiver is utilized as a comparative in providing control.

For a better understanding of the invention, together with other and further objects, advantages and capabilities thereof, reference is made to the following description of the accompanying drawing.

BRIEF DESCRIPTION OF THE DRAWING

The single FIGURE of the drawing is a schematic diagram, generally in block form, of a time base error compensating system in accordance with the invention.

DESCRIPTION OF THE INVENTION

The numeral 10 designates in block form a video tape recorder-reproducing system of the helical scan type and line 11 designates the video output on playback thereof. The signals from this output incude horizonal synchronizing components and these are subject to time base errors which require elimination. In accordance with the invention I provide an error free reference in the form of horizontal synchronizing signals appearing on line 12. These are produced by a voltage controlled oscillator 13 which is controlled as to frequency by an filter 14. The filter 14 and the oscillator 13 simulate in parameters and operation the horizontal scanning system of the television receiver readout 20 into which the output of the video reproducing system 10 is fed. In order to accomplish control horizontal synchronizing signals are stripped off the line 11 by a separating circuit 15. The stripping horizontal signals and the reference signals are applied to a phase discriminator 16 which generates an analog type error signal that appears on lines 18 and 19. It will be understood that the phase discriminator 16 and the filter 14 and the oscillator 13 are incorporated in a phase lock loop. The output on line 18 may be amplified if desired and applied to the filter 14, which simulates the automatic frequency control system of the television receiver 20, used as a readout or monitor.

The analog signal appearing on line 19 is converted into a digital output by an analog-to-digital converter 25, the outputs of which are used to control a delay network 21. This network contains a number of delay lines switched in binary fashion. The variable delay network 21 is inserted between the video output 11 of the reproducing system and the input line 22 of the television receiver readout. The signals appearing on line 22 are a time base corrected video. The error system or phase lock loop produces an analog signal which is a measure of time base error and this signal, converted to digital form, inserts the proper amount of delay in the video signals appearing on line 22 so that the horizontal oscillator of the readout sees no error.

In other words, the stripped horizontal signal from the recorder 11 phase locks the simulated scanning system 23. This system has a closed loop bandwidth supply narrower than that of a typical television receiver. The phase detector 16 detects phase error which occurs at the start of each recording. The amount of this phase error is measured by the analog-to-digital converter 20 and the amount of delay is inserted. The delay is switched in and out of the video signal path in response to generation of phase errors. Preferably the analog lines are switched in or out in binary steps. For a 7-bit code level seven delay lines are used, typically each having the following time delays:

0.5
0.1
0.2
0.4
0.8
1.6
and
3.2$\mu$ sec.

While there has been shown and described what is at present considered to be the preferred embodiment of the invention, it will be understood by those skilled in the art that various changes and modifications may be made therein without departing from the scope of the invention as described by the appended claims.

Having described my invention, I claim:

1. A circuit for correcting time base errors appearing in the output of a video tape reproducing device, which output is adapted to be applied in a video signal path to a television receiver readout having a horizontal scanning system, said circuit comprising:

Means for stripping horizontal synchronizing signals from said output, a local oscillator, detecting means having inputs coupled to the stripping means and the local oscillator and adapted to have applied thereto the stripped horizontal synchronizing signals and the output of said local oscillator to produce a resultant analog error signal, means for filtering said analog error signal and utilizing it to control said local oscillator, the ensemble of said local oscillator and said detecting means and said filtering means being proportioned to simulate in parameters and operation the horizontal scanning system of said television receiver readout, analog-to-digital converter means for converting said analog error signal into a digital control signal, a plurality of delay lines, and means intercoupling the converter and the delay lines for switching the delay lines into the video path in accordance with said digital control signal, thereby correcting time base errors appearing in said output.

2. A circuit in accordance with claim 1 in which the delay lines are proportioned to be switched into the video path in binary steps.

3. The method of correcting time base errors appearing in the output of a tape reproducing device, which output is adapted to be applied in a video signal path to a television receiver readout comprising:

the steps of stripping horizontal synchronizing signals from said output, developing a horizontal scanning signal which simulates the horizontal scanning signal of said television receiver readout, comparing the horizontal synchronizing signals and the horizontal scanning signals to develop an analog control signal, and introducing signal delays in said path as a function of said digital control signal.

* * * * *